United States Patent
Nakamura

(10) Patent No.: US 11,732,664 B2
(45) Date of Patent: Aug. 22, 2023

(54) CONTROL DEVICE OF VEHICLE DRIVE DEVICE, VEHICLE-MOUNTED ELECTRONIC CONTROL UNIT, TRAINED MODEL, MACHINE LEARNING SYSTEM, METHOD OF CONTROLLING VEHICLE DRIVE DEVICE, METHOD OF PRODUCING ELECTRONIC CONTROL UNIT, AND OUTPUT PARAMETER CALCULATION DEVICE

(71) Applicant: TOYOTA JIDOSHA KABUSHIKI KAISHA, Toyota (JP)

(72) Inventor: Toshihiro Nakamura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/568,852

(22) Filed: Sep. 12, 2019

(65) Prior Publication Data
US 2020/0109678 A1 Apr. 9, 2020

(30) Foreign Application Priority Data
Oct. 9, 2018 (JP) .................................. 2018-191237

(51) Int. Cl.
*F02D 41/14* (2006.01)
*G06N 3/04* (2023.01)
(Continued)

(52) U.S. Cl.
CPC ..... *F02D 41/1405* (2013.01); *F02D 41/0052* (2013.01); *F02D 41/3005* (2013.01);
(Continued)

(58) Field of Classification Search
CPC ............. F02D 41/1405; F02D 41/0052; F02D 41/3005; F02D 2200/0614; G06N 3/0454; F16H 2061/0084
See application file for complete search history.

(56) References Cited

U.S. PATENT DOCUMENTS 5,113,483 A * 5/1992 Keeler ................. G06V 10/454
706/31
5,130,936 A * 7/1992 Sheppard ............ G06F 11/2257
702/123
(Continued)

FOREIGN PATENT DOCUMENTS

CN 106740457 A * 5/2017
DE 10 2014 000396 A1 7/2015
(Continued)

OTHER PUBLICATIONS

Draelos, Rachel. Introduction to Neural Networks. Jan. 17, 2019. <https://glassboxmedicine.com/2019/01/17/introduction-to-neural-networks/>. (Year: 2019).*

*Primary Examiner* — Logan M Kraft
*Assistant Examiner* — Joshua Campbell
(74) *Attorney, Agent, or Firm* — Oliff PLC

(57) ABSTRACT

A control device 60 of a vehicle drive device comprises a processing part 81 configured to use a trained model using a neural network to calculate an output parameter of a vehicle, and a control part 82 configured to control the vehicle drive device based on the output parameter. The neural network includes a first input layer to which input parameters of the vehicle other than a design value are input, a second input layer to which the design values are input, a first hidden layer to which outputs of the first input layer are input, a second hidden layer to which outputs of the second input layer are input, and an output layer outputting the output parameter, and is configured so that the second
(Continued)

hidden layer becomes closer to the output layer than the first hidden layer.

21 Claims, 10 Drawing Sheets

(51) Int. Cl.
  *G06N 3/08*     (2023.01)
  *G05B 13/02*    (2006.01)
  *F02D 41/30*    (2006.01)
  *F02D 41/00*    (2006.01)

(52) U.S. Cl.
  CPC ............ *G05B 13/027* (2013.01); *G06N 3/04* (2013.01); *G06N 3/08* (2013.01); *F02D 2200/0406* (2013.01); *F02D 2200/0602* (2013.01); *F02D 2200/0614* (2013.01); *F02D 2200/101* (2013.01)

(56) References Cited

U.S. PATENT DOCUMENTS

| | | | | |
|---|---|---|---|---|
| 5,212,767 | A * | 5/1993 | Higashino | G06N 3/10 706/42 |
| 5,285,523 | A * | 2/1994 | Takahashi | G06N 3/0454 701/1 |
| 5,402,519 | A * | 3/1995 | Inoue | G06N 3/08 706/900 |
| 5,745,653 | A * | 4/1998 | Jesion | F02D 41/1405 706/23 |
| 5,781,700 | A * | 7/1998 | Puskorius | F02D 41/2454 706/14 |
| 9,328,644 | B2 * | 5/2016 | Cui | F02D 41/1405 |
| 9,718,464 | B2 | 8/2017 | Inoue et al. | |
| 9,914,492 | B1 | 3/2018 | Hummelshøj | |
| 9,977,239 | B2 | 5/2018 | Muramatsu | |
| 10,102,438 | B2 | 10/2018 | Kishi et al. | |
| 10,161,507 | B2 | 12/2018 | Fujii et al. | |
| 10,239,537 | B2 | 3/2019 | Otake | |
| 10,254,539 | B2 | 4/2019 | Ishiguro et al. | |
| 10,328,949 | B2 | 6/2019 | Kamata | |
| 10,486,691 | B2 | 11/2019 | Morisaki | |
| 10,513,253 | B2 | 12/2019 | Kuwahara et al. | |
| 10,562,520 | B2 | 2/2020 | Nishimine et al. | |
| 10,583,737 | B2 | 3/2020 | Chiba et al. | |
| 10,654,481 | B2 | 5/2020 | Ide | |
| 10,654,490 | B2 | 5/2020 | Urano et al. | |
| 10,706,300 | B2 | 7/2020 | Yamaoka et al. | |
| 10,723,349 | B2 | 7/2020 | Ozawa et al. | |
| 10,746,987 | B2 | 8/2020 | Lewis | |
| 10,780,828 | B2 | 9/2020 | Higashimachi et al. | |
| 10,816,975 | B2 | 10/2020 | Gaither et al. | |
| 10,850,703 | B2 | 12/2020 | Ando | |
| 10,890,658 | B2 | 1/2021 | Tachibana | |
| 10,913,360 | B2 | 2/2021 | Gaither | |
| 10,960,924 | B2 | 3/2021 | Rowell et al. | |
| 11,021,156 | B2 | 6/2021 | Jejima | |
| 11,091,035 | B2 | 8/2021 | Okada | |
| 11,117,595 | B2 | 9/2021 | Sasaki et al. | |
| 11,256,462 | B2 | 2/2022 | Yamada et al. | |
| 2001/0006004 | A1 | 7/2001 | Zanetti | |
| 2003/0163436 | A1 * | 8/2003 | Seifert | G06N 3/0454 706/26 |
| 2006/0020563 | A1 * | 1/2006 | Coleman | G06N 3/049 706/20 |
| 2008/0154811 | A1 * | 6/2008 | Grichnik | G06N 3/084 703/2 |
| 2010/0031738 | A1 * | 2/2010 | Feldkamp | G01M 15/042 73/114.79 |
| 2010/0050025 | A1 * | 2/2010 | Grichnik | G05B 17/02 714/E11.2 |
| 2012/0036097 | A1 * | 2/2012 | Prokhorov | G06N 3/049 706/20 |
| 2015/0088398 | A1 * | 3/2015 | Cui | F01N 11/00 701/101 |
| 2016/0071006 | A1 * | 3/2016 | Grothmann | G06N 3/08 706/16 |
| 2017/0308802 | A1 * | 10/2017 | Ramsoy | H04L 63/0421 |
| 2018/0108369 | A1 * | 4/2018 | Gross | B60R 25/1009 |
| 2018/0113963 | A1 * | 4/2018 | Kordon | G05B 17/02 |
| 2019/0019080 | A1 * | 1/2019 | Claessens | G06N 3/0472 |
| 2019/0248287 | A1 | 8/2019 | Ono et al. | |
| 2021/0221362 | A1 | 7/2021 | Matsumura et al. | |
| 2022/0242240 | A1 | 8/2022 | Sasaki et al. | |

FOREIGN PATENT DOCUMENTS

| | | | | |
|---|---|---|---|---|
| JP | 09039821 | A * | 2/1997 | |
| JP | H09-039821 | A | 2/1997 | |
| JP | 2011-054200 | A | 3/2011 | |
| WO | WO-2007113080 | A1 * | 10/2007 | ........... B60R 21/013 |
| WO | WO-2016170063 | A1 * | 10/2016 | ............. G06F 30/17 |

\* cited by examiner

CONTROL DEVICE OF VEHICLE DRIVE DEVICE, VEHICLE-MOUNTED ELECTRONIC CONTROL UNIT, TRAINED MODEL, MACHINE LEARNING SYSTEM, METHOD OF CONTROLLING VEHICLE DRIVE DEVICE, METHOD OF PRODUCING ELECTRONIC CONTROL UNIT, AND OUTPUT PARAMETER CALCULATION DEVICE

FIELD

The present invention relates to a control device of a vehicle drive device, a vehicle-mounted electronic control unit, a trained model, a machine learning system, a method of controlling a vehicle drive device, a method of producing an electronic control unit, and an output parameter calculation device.

BACKGROUND

It has been known in the past to use a neural network including an input layer, intermediate layers (hidden layers), and an output layer to derive predetermined output parameters from predetermined input parameters (for example, PTL 1). In the neural network described in PTL 1, the nodes of the input layer are connected in parallel to the nodes of one intermediate layer. A model using a neural network can be applied to any hardware having parameters able to be used as the input parameters and output parameters.

CITATION LIST

Patent Literature

[PTL 1] Japanese Unexamined Patent Publication No. 2011-54200

SUMMARY

Technical Problem

In this regard, in the design of hardware, the required design values of the hardware are determined in accordance with the specifications of the hardware. For example, when the hardware is an internal combustion engine, the design values are the compression ratio, number of cylinders, cylinder array, etc.

The design values of hardware are fixed at constant values after manufacture of the hardware. That is, the design values of hardware do not fluctuate in accordance with the operating state of the hardware. For this reason, if a model using a neural network is applied to only specific hardware, basically the design values of the hardware do not have to be used as input parameters.

However, to flexibly handle design changes etc. of hardware, it is preferable to be able to apply a model using a neural network to a plurality of hardware with different design values.

In this case, it is necessary to use the design values of the hardware as input parameters. However, PTL 1 does not allude at all to use of the design values of hardware as the input parameters.

Therefore, an object of the present invention is to improve the prediction precision of an output parameter if design values of hardware are used as input parameters of the neural network.

Solution to Problem

The summary of the present disclosure is as follows.

(1) A control device of a vehicle drive device comprising a processing part configured to use a trained model using a neural network to calculate at least one output parameter of a vehicle, and a control part configured to control the vehicle drive device mounted in a vehicle based on the at least one output parameter calculated by the processing part, wherein the neural network includes a first input layer to which at least one input parameter of the vehicle other than at least one design value of the vehicle drive device is input, a second input layer to which the at least one design value is input, a first hidden layer to which outputs of the first input layer are input, a second hidden layer to which outputs of the second input layer are input, and an output layer outputting the at least one output parameter and is configured so that the second hidden layer becomes closer to the output layer than the first hidden layer.

(2) The control device of a vehicle drive device described in above (1), wherein the neural network is configured so that the outputs of the first hidden layer are input to the second hidden layer.

(3) The control device of a vehicle drive device described in above (1), wherein the neural network includes at least one hidden layer between the first hidden layer and the second hidden layer.

(4) The control device of a vehicle drive device described in any one of above (1) to (3), wherein the neural network is configured so that the outputs of the second hidden layer are input to the output layer.

(5) The control device of a vehicle drive device described in any one of above (1) to (3), wherein the neural network includes at least one hidden layer between the second hidden layer and the output layer.

(6) The control device of a vehicle drive device described in any one of above (1) to (5), wherein the control part is configured to control an internal combustion engine mounted in a vehicle, the at least one input parameter includes an engine speed and fuel injection amount, the at least one design value includes a compression ratio of the internal combustion engine, and the at least one output parameter includes an exhaust temperature.

(7) The control device of a vehicle drive device described in above (6), wherein the at least one design value further include a number of cylinders of the internal combustion engine and a cylinder array of the internal combustion engine.

(8) The control device of a vehicle drive device described in any one of above (1) to (5), wherein the neural network further includes a third input layer to which at least one input parameter of the vehicle other than the at least one design value is input, a fourth input layer to which the at least one design value is input, a third hidden layer to which outputs of the third input layer are input, and a fourth hidden layer to which outputs of the fourth input layer are input and is configured so that the third hidden layer is closer to the output layer than the second hidden layer and the fourth hidden layer is closer to the output layer than the third hidden layer, the control part is configured to control an internal combustion engine mounted in the vehicle, and the at least one input parameter input to the first input layer includes a pressure and flow rate of intake in an intake manifold, the at least one design value input to the second input layer includes an inside diameter of the intake manifold, the at least one input parameter input to the third input layer includes an injection pressure and injection amount of fuel injected into cylinders of the internal combustion engine, the at least one design value input to the fourth input layer includes a compression ratio of the internal combustion engine, and the output parameters include an output torque of the internal combustion engine.

(9) A vehicle-mounted electronic control unit comprising a processing part configured to receive a trained model using a neural network through a communication device provided in a vehicle from a server at an outside of the vehicle and use the trained model to calculate at least output parameter of the vehicle, wherein the neural network includes a first input layer to which at least one input parameter of the vehicle other than at least one design value of the vehicle drive device mounted in the vehicle is input, a second input layer to which the at least one design value is input, a first hidden layer to which outputs of the first input layer are input, a second hidden layer to which outputs of the second input layer are input, and an output layer outputting at least one output parameter and is configured so that the second hidden layer becomes closer to the output layer than the first hidden layer and the server comprises a storage device storing sets of training data including the at least one input parameter, the at least one design value, and the at least output parameter, and uses the sets of training data to generate the trained model.

(10) A vehicle-mounted electronic control unit comprising a parameter acquiring part configured to acquire at least one design value of a vehicle drive device mounted in a vehicle, at least one input parameter of the vehicle other than the at least one design value, and at least one output parameter of the vehicle and send the at least one design value, the at least one input parameter, and the at least one output parameter through a communication device provided in the vehicle to a server at an outside of the vehicle, and a processing part configured to receive a trained model using a neural network from the server through the communication device and use that trained model to calculate the at least one output parameter, wherein the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter and is configured so that the second hidden layer becomes closer to the output layer than the first hidden layer and the server uses the at least one input parameters, the at least one design value, and the at least one output parameter acquired by the parameter acquiring part as sets of training data to generate the trained model.

(11) A trained model using a neural network including a first input layer to which at least one input parameter of a vehicle other than at least one design value of the vehicle drive device mounted in the vehicle is input, a second input layer to which the at least one design value is input, a first hidden layer to which outputs of the first input layer are input, a second hidden layer to which outputs of the second input layer are input, and an output layer outputting at least one output parameter of the vehicle and configured so that the second hidden layer becomes closer to the output layer than the first hidden layer, wherein the at least one input parameter, the at least one design value, and the at least one output parameter are used as sets of training data to perform learning of weights of the neural network.

(12) A machine learning system comprising an electronic control unit provided at a vehicle, a communication device provided at the vehicle, and a server at an outside of the vehicle, wherein the electronic control unit comprises a parameter acquiring part configured to acquire at least one design value of a vehicle drive device mounted in the vehicle, at least one input parameter of the vehicle other than the at least one design value, and at least one output parameter of the vehicle, and send the at least one design value, the at least one input parameter, and the at least one output parameter through the communication device to the server, and a processing part configured to receive a trained model using a neural network from the server through the communication device and use the trained model to calculate the at least one output parameter, the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter and is configured so that the second hidden layer becomes closer to the output layer than the first hidden layer and the server uses the at least one input parameter, the at least one design value, and the at least one output parameter acquired by the parameter acquiring part as sets of training data to generate the trained model.

(13) A method of controlling a vehicle drive device comprising: acquiring at least one design value of a vehicle drive device mounted in a vehicle and at least one input parameter of the vehicle other than the at least one design value, using a trained model using a neural network to calculate at least one output parameter of the vehicle based on the at least one design value and the at least one input parameter, and controlling the vehicle drive device based on the at least one output parameter, wherein the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter and is configured so that the second hidden layer becomes closer to the output layer than the first hidden layer.

(14) A method of producing an electronic control unit comprising using at least one design value of a vehicle drive device mounted in a vehicle, at least one input parameter of the vehicle other than the at least one design value, and at least one output parameter of the vehicle as sets of training data to generate a trained model using a neural network, and implementing the trained model in the electronic control unit, wherein the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter and is configured so that the second hidden layer becomes closer to the output layer than the first hidden layer.

(15) An output parameter calculation device configured to use a trained model using a neural network, which includes a first input layer to which at least one input parameter other than at least one design value of a hardware is input, a second input layer to which the at least one design value is input, a first hidden layer to which outputs of the first input layer are input, a second hidden layer to which outputs of the second input layer are input, and an output layer outputting at least one output parameter and is configured so that the second hidden layer becomes closer to the output layer than the first hidden layer, to calculate the at least one output parameter based on the at least one input parameter and the at least one design value.

Advantageous Effects of Invention

According to the present invention, it is possible to improve the prediction precision of an output parameter if design values of hardware are used as input parameters of the neural network.

DESCRIPTION OF EMBODIMENTS

Figure 1:
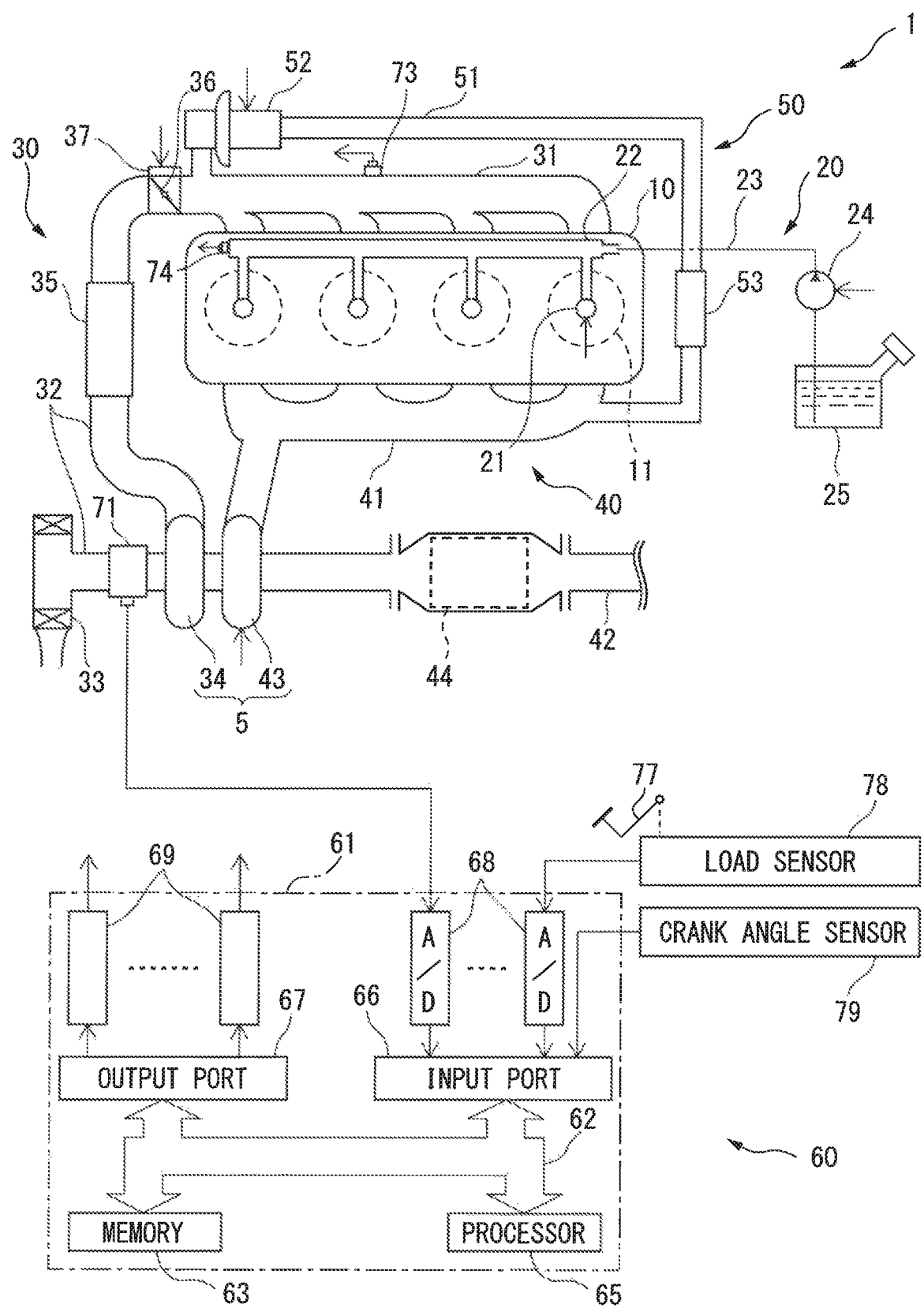
FIG. 1 is a view schematically showing an internal combustion engine in which a control device of a vehicle drive device according to a first embodiment is used.

Below, referring to the drawings, embodiments of the present invention will be explained in detail. Note that, in the following explanation, similar component elements are assigned the same reference notations.

First Embodiment

First, referring to FIG. 1 to FIG. 8, a first embodiment of the present invention will be explained.

<Explanation of Internal Combustion Engine as a Whole>

FIG. 1 is a view schematically showing an internal combustion engine in which a control device of a vehicle drive device according to a first embodiment is used. The internal combustion engine 1 shown in FIG. 1 is a compression ignition type internal combustion engine (diesel engine) and is mounted in a vehicle. The internal combustion engine 1 is a hardware mounted in a vehicle and is one example of a vehicle drive device mounted in a vehicle.

The internal combustion engine 1 is provided with an engine body 10, a fuel feed system 20, an intake system 30, an exhaust system 40, and an exhaust gas recirculation (EGR) system 50. The engine body 10 is provided with a cylinder block in which a plurality of cylinders 11 are formed, a cylinder head in which intake ports and exhaust ports are formed, and a crankcase. In the present embodiment, there are four cylinders 11. Inside of each cylinder 11, a piston is arranged. Each cylinder 11 is communicated with an intake port and exhaust port. Further, at the cylinder head, intake valves configured to open and close the intake ports and exhaust valves configured to open and close the exhaust ports are provided.

The fuel feed system 20 is provided with fuel injectors 21, a common rail 22, a fuel feed pipe 23, a fuel pump 24 and a fuel tank 25. The fuel injectors 21 are connected through the common rail 22 and fuel feed pipe 23 to the fuel tank 25. The fuel injectors 21 are arranged in the cylinder head so as to directly inject fuel into combustion chambers of the cylinders 11. The fuel injectors 21 are so-called "cylinder injectors". At the fuel feed pipe 23, a fuel pump 24 for pumping fuel inside the fuel tank 25 is arranged. The fuel pumped by the fuel pump 24 is fed through the fuel feed pipe 23 to the common rail 22 and is directly injected from the fuel injectors 21 to the insides of the combustion chambers of the cylinders 11. The pressure of the fuel in the common rail 22 is adjusted by changing the output of the fuel pump 24.

The intake system 30 is provided with intake ports, an intake manifold 31, intake pipe 32, air cleaner 33, compressor 34 of the turbocharger 5, intercooler 35, and throttle valve 36. The intake ports, intake manifold 31, and intake pipe 32 form an intake passage guiding air to the insides of the cylinders 11.

The intake ports of the cylinders 11 are communicated through the intake manifold 31 and intake pipe 32 to the air cleaner 33. Inside of the intake pipe 32, a compressor 34 for compressing and discharging intake air flowing through the intake pipe 32, and an intercooler 35 cooling the air compressed by the compressor 34 are provided. The throttle valve 36 can be made to turn by a throttle valve drive actuator 37 so as to change the opening area of the intake passage.

The exhaust system 40 is provided with exhaust ports, an exhaust manifold 41, exhaust pipe 42, turbine 43 of the turbocharger 5, and diesel particulate filter (DPF) 44. The exhaust ports, exhaust manifold 41, and exhaust pipe 42 form an exhaust passage discharging exhaust gas produced due to combustion of the air-fuel mixture inside the combustion chambers.

The exhaust ports of the cylinders 11 communicate through the exhaust manifold 41 and the exhaust pipe 42 with the DPF 44. The exhaust pipe 42 is provided with a turbine 43 driven to turn by the energy of the exhaust gas. If the turbine 43 is driven to turn, along with this, the compressor 34 is turned and accordingly the intake air is compressed. In the present embodiment, the turbine 43 is provided with a variable nozzle. If the opening degree of the variable nozzle is changed, the flow rate of the exhaust gas supplied to the turbine blades of the turbine 43 changes. As a result, the rotational speed of the turbine 43 changes.

The DPF 44 traps the particulate matter (PM) in the exhaust gas. Note that, the exhaust system 40 may be provided with another exhaust purification device instead of the DPF 44 or in addition to the DPF 44. The other exhaust purification device, for example, may be a selective reduction type $NO_X$ reduction catalyst (SCR catalyst), $NO_X$ storage reduction catalyst, oxidation catalyst, etc.

The EGR system 50 feeds a part of the exhaust gas discharged from the engine body 10 to the exhaust passage to the intake passage. The EGR system 50 is provided with an EGR pipe 51, EGR control valve 52, and EGR cooler 53. The EGR pipe 51 is connected with the exhaust manifold 41 and the intake manifold 31 and connects these with each other. At the EGR pipe 51, an EGR cooler 53 is provided for cooling the EGR gas flowing through the inside of the EGR pipe 51. Further, the EGR pipe 51 is provided with an EGR control valve 52 able to change the opening area of the EGR passage formed by the EGR pipe 51. By controlling the opening degree of the EGR control valve 52, the amount of flow of the EGR gas recirculated from the exhaust manifold 41 to the intake manifold 31 is adjusted and, as a result, the EGR rate is changed. Note that, the EGR rate is the ratio of the amount of EGR gas to the total amount of gas fed to the insides of the cylinders 11 (total of amount of fresh air and amount of EGR gas).

Note that, the configuration of the internal combustion engine 1 is not limited to the above configuration. Therefore, the specific configuration of the internal combustion engine such as the cylinder array, mode of injection of fuel, configuration of the intake and exhaust systems, configuration of the valve drive mechanism, configuration of the supercharger, and presence of a supercharger may differ from the configuration shown in FIG. 1. For example, the internal combustion engine 1 may be a spark ignition type internal combustion engine (for example gasoline engine) provided with spark plugs for igniting the air-fuel mixture. In this case, instead of the DPF 44, a gasoline particulate filter (GPF), three-way catalyst, etc., is provided. Further, if the internal combustion engine 1 is a spark ignition type internal combustion engine, the fuel injectors 21 may be port injectors arranged so as to inject fuel into the intake ports.

<Control Device of Vehicle Drive Device>

The control device 60 of the vehicle drive device (in the present embodiment, the internal combustion engine 1) is provided with an electronic control unit (ECU) 61 and the various sensors. The various controls of the internal combustion engine 1 are performed by the ECU 61 based on the outputs of the various sensors, etc.

The ECU 61 is comprised of a digital computer and is provided with components connected with each other through a bidirectional bus 62 such as a memory 63, processor 65, input port 66, and output port 67. The memory 63 is provided with a volatile memory (for example, RAM) and nonvolatile memory (for example, ROM) and stores programs to be run at the processor 65, various data used when various processing is performed by the processor 65, etc.

The outputs of the various sensors are input to the input port 66. In the present embodiment, the outputs of an air flow meter 71, intake pressure sensor 73, fuel pressure sensor 74, and load sensor 78 are input through corresponding AD converters 68 to the input port 66.

The air flow meter 71 is arranged in the intake pipe 32 between the air cleaner 33 and the compressor 34 and detects the flow rate of air inside the intake pipe 32. The intake pressure sensor 73 is arranged in the intake manifold 31 and detects the pressure of the intake in the intake manifold 31 (in the present embodiment, fresh air and EGR gas).

The fuel pressure sensor 74 is arranged in the common rail 22 and detects the pressure of the fuel inside the common rail 22, that is, the pressure of the fuel fed to the fuel injectors 21. The load sensor 78 is connected to an accelerator pedal 77 provided in the vehicle and generates an output voltage proportional to the amount of depression of the accelerator pedal 77. The load sensor 78 detects the engine load. Further, the input port 66 is connected to a crank angle sensor 79 generating an output pulse each time the crankshaft for example rotates by 10°. The output pulse is input to the input port 66. The crank angle sensor 79 detects the engine speed.

On the other hand, the output port 67 is connected through the corresponding drive circuits 69 to various actuators of the internal combustion engine 1. In the present embodiment, the output port 67 is connected to a variable nozzle of the turbine 43, the fuel injectors 21, fuel pump 24, throttle valve drive actuator 37, and EGR control valve 52. The ECU 61 outputs control signals for controlling these actuators from the output port 67 to thereby control the internal combustion engine 1.

Figure 2:
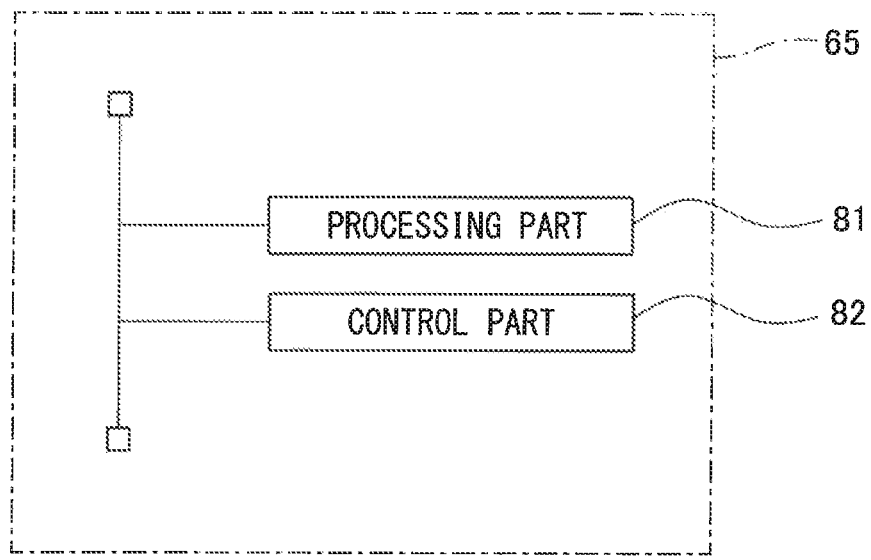
FIG. 2 is a functional block diagram of a processor of an ECU in the first embodiment.

FIG. 2 is a functional block diagram of a processor 65 of the ECU 61 in the first embodiment. In the present embodiment, the processor 65 has a processing part 81 and control part 82. The processing part 81 uses a trained model using a neural network to calculate the output parameters of the vehicle. The control part 82 controls the vehicle drive device based on the output parameters of the vehicle calculated by the processing part 81.

<Summary of Neural Network>

Figure 3:
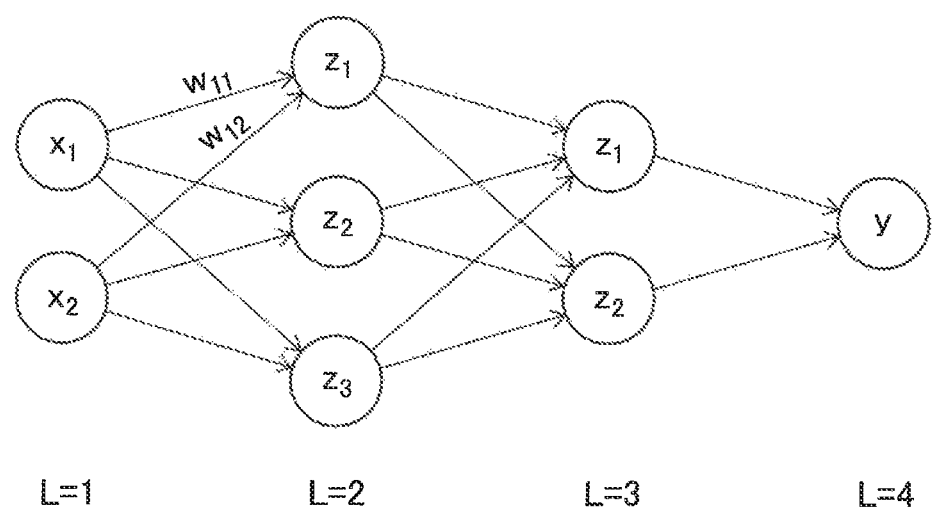
FIG. 3 shows an example of a neural network having a simple configuration.

First, referring to FIG. 3, a summary of the neural network will be explained. FIG. 3 shows one example of a neural network having a simple configuration.

The circle marks in FIG. 3 show artificial neurons. An artificial neuron is usually called a "node" or "unit" (in this Description, called a "node"). In FIG. 3, L=1 indicates an input layer, L=2 and L=3 indicates hidden layers, and L=4 indicates an output layer. Note that, the hidden layers are also called "intermediate layers".

In FIG. 3, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 3, the total input values $u_k^{(L=2)}$ calculated at the nodes shown by $z_k^{(L=2)}$ (k=1, 2, 3) of the hidden layer (L=2) become as in the following equation (M is the number of nodes of the input layer).

[Equation 1]

$$u_k^{(L=2)} = \sum_{m=1}^{M} \left( x_m \cdot W_{km}^{(L=2)} \right) + b_k$$

Next, this total input values $u_k^{(L=2)}$ are converted by the activation function "f" and are output as the output values $z_k^{(L=2)}$ (=$f(u_k^{(L=2)})$) from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "b" are used to calculate the total input values "u" (=Σz·w+b). The total input values "u" are similarly converted by an activation function and are output from the nodes of the hidden layers (L=3) as the output values $z_1^{(L=3)}$ and $z_2^{(L=3)}$. The activation function is for example a Sigmoid function σ.

Further, the node of the output layer (L=4) receives as input the output values $z_1^{(L=3)}$ and $z_2^{(L=3)}$ of the nodes of the hidden layer (L=3). At the node of the output layer, the corresponding weights "w" and biases "b" are used to calculate the total input value "u" (Σz·w+b) or only the corresponding weights "w" are used to calculate the total input value "u" (Σz·w). For example, at the node of the output layer, an identity function is used as the activation function. In this case, the total input value "u" calculated at the node of the output layer is output as it is as the output value "y" from the node of the output layer.

<Learning at Neural Network>

In the present embodiment, the error backpropagation algorithm is used to learn the values of the weights "w" and the values of the biases "b" inside the neural network. The error backpropagation algorithm is known, so the error backpropagation algorithm will be explained only in brief below. Note that, a bias "b" is a type of weight "w", so in the following explanation, a bias "b" is considered one weight "w".

In the neural network such as shown in FIG. 3, if expressing the weights at the total input values $u^{(L)}$ to the nodes of the layers of L=2, L=3 or L=4 as $w^{(L)}$, the differential according to the weights $w^{(L)}$ of the error function E, that is, gradients $\partial E/\partial w^{(L)}$, are rewritten as the following equation:

[Equation 2]

$$\partial E/\partial w^{(L)} = (\partial E/\partial u^{(L)})(\partial u^{(L)}/\partial w^{(L)}) \qquad (1)$$

Here, $z^{(L-1)} \cdot \partial w^{(L)} = \partial u^{(L)}$, and therefore if $(\partial E/\partial u^{(L)}) = \delta^{(L)}$, the above-mentioned equation (1) is converted to the following equation:

[Equation 3]

$$\partial E/\partial w^{(L)} = \delta^{(L)} \cdot z^{(L-1)} \qquad (2)$$

Here, if $u^{(L)}$ change, a change in the error function E is caused through changes in the total input values $u^{(L+1)}$ of the next layer, so $\delta^{(L)}$ can be expressed by the following equation (K is the number of nodes at the L+1 layer).

[Equation 4]

$$\delta^{(L)} = \left(\frac{\partial E}{\partial u^{(L)}}\right) = \sum_{k=1}^{K}\left(\frac{\partial E}{\partial u_k^{(L+1)}}\right)\left(\frac{\partial u_k^{(L+1)}}{\partial u^{(L)}}\right)(k=1,2,\ldots,K) \qquad (3)$$

Here, if $z^{(L)} = f(u^{(L)})$, the total input values $u_k^{(L+1)}$ at the right side of the above equation (3) are expressed by the following equation:

[Equation 5]

$$u_k^{(L+1)} = \sum_{k=1}^{K} w_k^{(L+1)} \cdot z^{(L)} = \sum_{k=1}^{K} w_k^{(L+1)} \cdot f(u^{(L)}) \qquad (4)$$

Here, the first term $(\partial E/\partial u^{(L+1)})$ at the right side of the above equation (3) is $\delta^{(L+1)}$. Further, the second term $(\partial u_k^{(L+1)}/\partial u^{(L)})$ at the right side of the above equation (3) is expressed by the following equation:

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \qquad (5)$$

Therefore, $\delta^{(L)}$ is expressed by the following equation:

[Equation 7]

$$\delta^{(L)} = \sum_{k=1}^{K} w_k^{(L+1)} \cdot \delta^{(L+1)} \cdot f'(u^{(L)}) \qquad (6)$$

That is, $$\delta^{(L-1)} = \sum_{k=1}^{K} w_k^{(L)} \cdot \delta^{(L)} \cdot f'(u^{(L-1)})$$

That is, if $\delta^{(L+1)}$ is found, $\delta^{(L)}$ can be found.

If the neural network is trained, a set of training data including a certain input value "x" and true data $y_t$ of the output for that input value "x" is used. If the output value from the output layer for a certain input value "x" is "y", and the squared error is used as the error function, the error function E becomes $E=½(y-y_t)^2$. Further, at the node of the output layer (L=4) of FIG. 3, the output value "y" becomes $f(u^{(L)})$. For this reason, the value of $\delta^{(L)}$ at the node of the output layer (L=4) becomes as shown in the following equation:

[Equation 8]

$$\delta^{(L)} = \partial E/\partial u^{(L)} = (\partial E/\partial y)(\partial y/\partial u^{(L)}) = (y-y_t) \cdot f'(u^{(L)}) \qquad (7)$$

Here, if the activation function $f(u^{(L)})$ of the output layer is an identity function, $f'(u^{(L)})=1$. Therefore, $\delta^{(L)}=y-y_t$ and $\delta^{(L)}$ is found.

If $\delta^{(L)}$ is found, the above equation (6) is used to find the $\delta^{(L-1)}$ of the previous layer. In this way, the δ's of the previous layers are successively found. The values of these δ's are used to find the differential according to the weights "w" of the error function E, that is, the gradient $\partial E/\partial w^{(L)}$ from the above equation (2). If the gradient $\partial E/\partial w^{(L)}$ is found, this gradient $\partial E/\partial w^{(L)}$ is used to update the values of the weights "w" so that the value of the error function E is decreased. That is, learning of the weights "w" are performed.

Neural Network in Present Embodiment

Below, a neural network in the present embodiment will be explained. In the present embodiment, the model using a neural network is applied to a plurality of vehicle drive device with different design values. By doing this, even if design changes result in changes to the design values of the vehicle drive device or even if a new type of vehicle drive device is developed, there is no need to generate a new model. A shared model can be used to calculate the output parameter. Further, in order to apply the model to a vehicle drive device with different design values, it is not necessary to use a large amount of sets of training data to again perform learning of the neural network.

In the present embodiment, in order to apply the model to a plurality of vehicle drive device with different design values, the design values of the vehicle drive device are used as input parameters of the neural network. In this case, it may be considered to input the design values together with other input parameters other than the design values to the same input layer of the neural network.

However, the design values of a vehicle drive device are fixed at constant values after manufacture of the vehicle drive device. Therefore, the design values become constants in individual vehicles. For this reason, the design values have properties different from other input parameters changing in accordance with the operating state of a vehicle.

Figure 4:
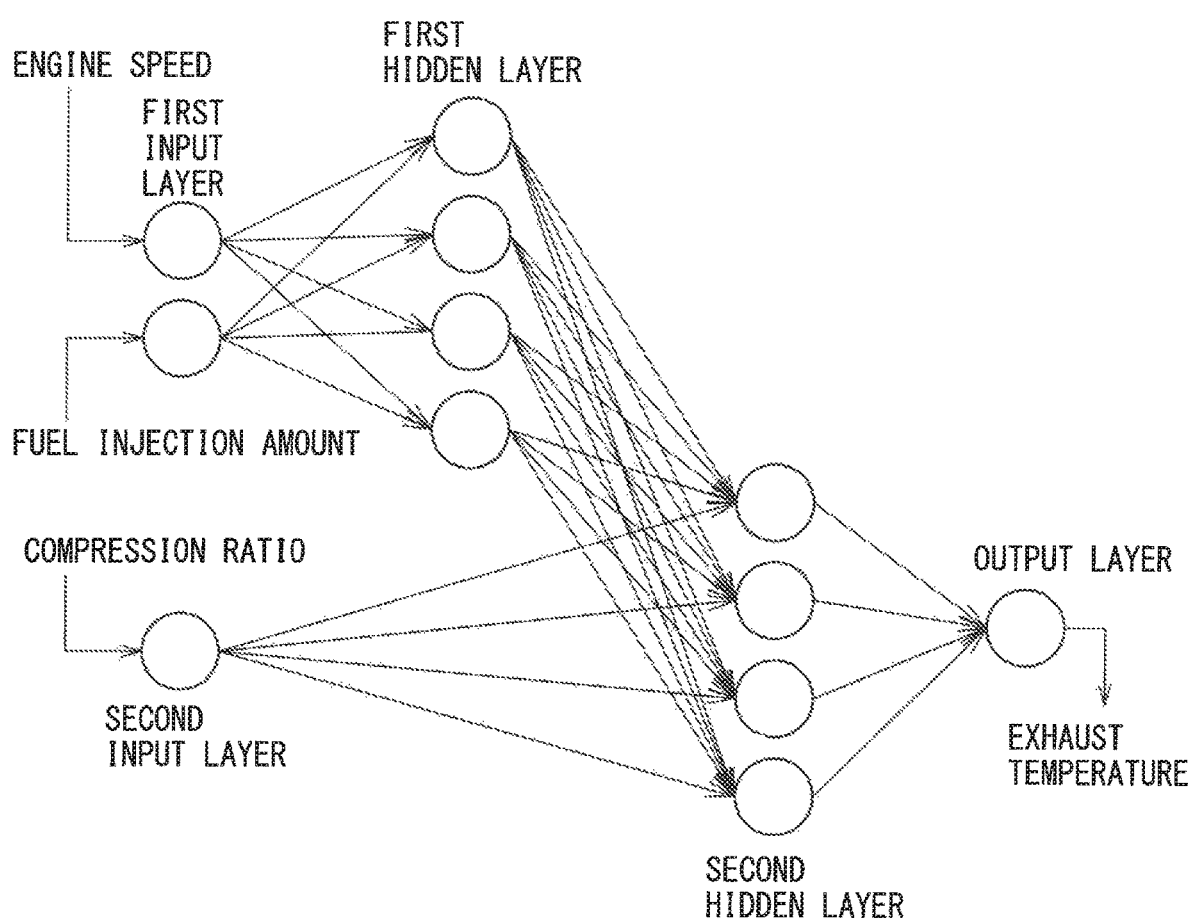
FIG. 4 is a view showing an example of a neural network in the first embodiment.

The inventors of the present application engaged in intensive studies and as a result discovered that by inputting design values of a vehicle drive device into an input layer different from the other input parameters, it is possible to improve the prediction precision of output parameters. FIG. 4 is a view showing one example of a neural network in a first embodiment.

As shown in FIG. 4, a neural network includes a first input layer and a second input layer. Therefore, the neural network includes a plurality of input layers. The first input layer receives as input the input parameters of the vehicle other than the design values of the vehicle drive device, while the second input layer receives as input the design values of the vehicle drive device. The input parameters of the vehicle other than the design values are values changing in accordance with the operating state of the vehicle. On the other hand, the design values of the vehicle drive device are preset values not changing in accordance with the operating state of the vehicle.

In the present embodiment, the vehicle drive device is an internal combustion engine 1. For example, the neural network shown in FIG. 4 outputs the exhaust temperature as the output parameter. In this case, for example, as the input parameters of the vehicle input to the first input layer, the engine speed and the amount of fuel injection from the fuel injectors 21 are used, and thus the number of nodes in the first input layer is two. Further, for example, as the design value input to the second input layer, the compression ratio of the internal combustion engine 1 is used, and thus the number of the node in the second input layer is one. Note that, the number of nodes of each of the input layers is equal to the number of input parameters input to each of the input layers.

Further, the neural network includes a first hidden layer and second hidden layer. Therefore, the neural network includes a plurality of hidden layers. In the example of FIG. 4, the number of nodes in the first hidden layer is four and the number of nodes in the second hidden layer is four. That is, the number of nodes of the first hidden layer and the number of nodes in the second hidden layer are equal. Further, in the example of FIG. 4, the number of the input layers and the number of the hidden layers are equal.

The first input layer is connected to the first hidden layer. Specifically, the nodes of the first input layer are respectively connected to all of the nodes of the first hidden layer. For this reason, the first hidden layer receives as input the outputs of the first input layer. Specifically, the nodes of the first hidden layer respectively receive as input the outputs of all of the nodes of the first input layer.

The second input layer is connected to the second hidden layer. Specifically, the node of the second input layer is connected to all of the nodes of the second hidden layer. For this reason, the second hidden layer receives as input the output of the second input layer. Specifically, the nodes of the second hidden layer respectively receive as input the output of the node of the second input layer.

Further, the second hidden layer also receives, as input, values correlated with the outputs of the first hidden layer. The values correlated with the first hidden layers include the outputs of the first hidden layer, and the outputs of the first hidden layer converted by another hidden layer when there is another hidden layer between the first hidden layer and the second hidden layer. In the example of FIG. 4, the first hidden layer is connected with the second hidden layer. Specifically, the nodes of the first hidden layer are respectively connected to all of the nodes of the second hidden layer. For this reason, the second hidden layer receives as input the outputs of the first hidden layer. Specifically, the nodes of the second hidden layer respectively receive as input the outputs of all of the nodes of the first hidden layer.

Further, the neural network includes an output layer outputting an output parameter of the vehicle. The output layer outputs the output parameter of the vehicle based on the outputs of the first hidden layer and the outputs of the second hidden layer. As explained above, for example, as the output parameter of the vehicle, the exhaust temperature is used. In this case, the number of the node in the output layer is one. The number of nodes of the output layer is equal to the number of output parameters output from the output layer.

The output layer receives, as input, values correlated with the outputs of the second hidden layer. The values correlated with the second hidden layers include the outputs of the second hidden layer, and the outputs of the second hidden layer converted by another hidden layer when there is another hidden layer between the second hidden layer and the output layer. In the example of FIG. 4, the second hidden layer is connected with the output layer. Specifically, the nodes of the second hidden layers are respectively connected to the node of the output layer. For this reason, the output layer receives as input the outputs of the second hidden layer. Specifically, the node of the output layer receives as input the outputs of all of the nodes of the second hidden layer.

Further, the design values are believed to function so as to correct feature values generated from the input parameters other than the design values. In order for this function to be expressed in the neural network, in the present embodiment, the neural network is configured so that the second hidden layer to which the second input layer is connected becomes closer to the output layer than the first hidden layer to which the first input layer is connected. In other words, the neural network is configured so that the second hidden layer to which the second input layer is connected becomes a deeper layer than the first hidden layer to which the first input layer is connected. As a result, the design values and the feature values generated from input parameters other than the design values are input to the second hidden layer, and the above function is realized by the second hidden layer. As a result, it is possible to improve the prediction precision of the output parameter.

Figure 5:
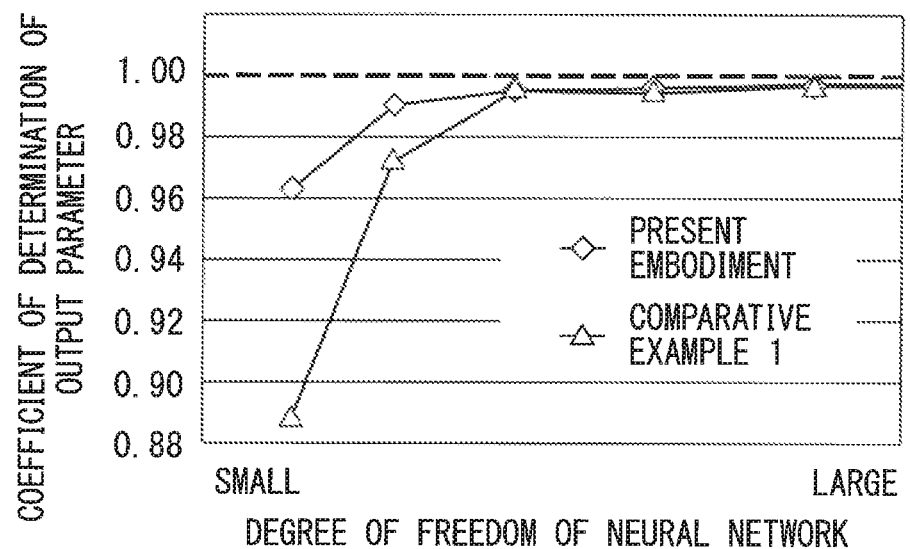
FIG. 5 is a view showing a relationship between a degree of freedom of a neural network and a coefficient of determination of an output parameter.
Figure 6:
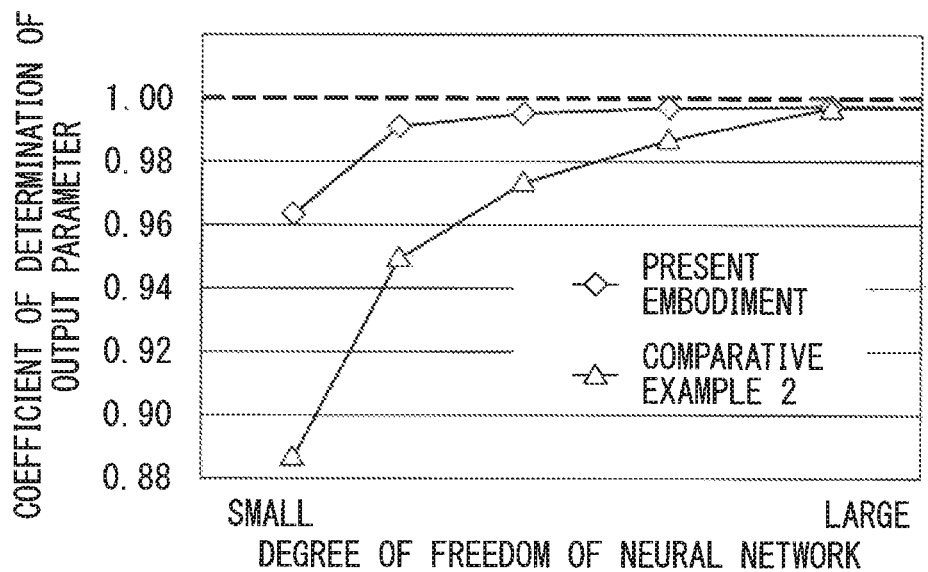
FIG. 6 is a view showing a relationship between a degree of freedom of a neural network and a coefficient of determination of an output parameter.

FIG. 5 and FIG. 6 are views showing the relationship between the degree of freedom of the neural network and the coefficient of determination of an output parameter. The degree of freedom of the neural network becomes greater the greater the numbers of weights and biases which can be set. That is, the degree of freedom of the neural network becomes larger the larger the number of input layers, the number of nodes of the input layer, the number of hidden layers, and the numbers of nodes of the hidden layers.

Further, the coefficient of determination $R^2$ of the output parameter is calculated by the following equation and takes a value of 0 to 1. The prediction precision of the output parameter becomes higher the closer the coefficient of determination of the output parameter to 1.

$R^2$=(Error sum of squares of predicted value of output parameter)/(Error sum of squares of observed value of output parameter)

Here, the predicted value of the output parameter is the value output by the neural network after learning, while the observed value of the output parameter is the value actually detected using a sensor etc.

In FIG. 5, the results obtained using the neural network shown in FIG. 4 are plotted by diamond marks, while the results obtained using the neural network of Comparative Example 1 are plotted by triangle marks. In the neural network of Comparative Example 1, the second input layer was omitted from the neural network shown in FIG. 4, and the engine speed, fuel injection amount, and compression ratio of the internal combustion engine 1 were input to the first input layer.

In FIG. 6, the results obtained using the neural network shown in FIG. 4 are plotted by diamond marks, while the results obtained using the neural network of Comparative Example 2 are plotted by triangle marks. In the neural network of Comparative Example 2, the fuel injection amount and compression ratio of the internal combustion engine 1 in the neural network shown in FIG. 4 are switched. That is, the engine speed and the compression ratio of the internal combustion engine 1 are input to first input layer while the fuel injection amount is input to the second input layer.

As will be understood from FIG. 5 and FIG. 6, in the neural network shown in FIG. 4, compared with Comparative Examples 1 and 2, even when the degree of freedom of the neural network is small, the coefficient of determination of the output parameter becomes larger and the prediction precision of the output parameter becomes higher. Therefore, it is possible to raise the prediction precision of the output parameter without increasing the degree of freedom of the neural network. As a result, it is possible to reduce the learning time for generating a trained model using the neural network.

Note that, in the neural network shown in FIG. 4, the number of the hidden layers may be three or more. Further, the numbers of nodes of each input layer, each hidden layer, and output layer may respectively be one or more other numbers. Further, the numbers of nodes of the hidden layers may be different. Further, as the design values and the input parameters other than the design values and output parameters, parameters different from FIG. 4 may be used.

For example, as input parameters other than the design values, instead of the fuel injection amount, the engine load may be used. Further, as the design values, in addition to the compression ratio of the internal combustion engine 1, the number of cylinders and cylinder array of the internal combustion engine 1 may be used. Since numerical values must be input to the input layer, in this case, the number of nodes in the second input layer becomes three. Further, if the cylinder array is input to the second input layer, the cylinder array is converted to a numerical value. For example, "1" is assigned to an in-line cylinder array, 2 is assigned to a V-shaped cylinder array, and 3 is assigned to a horizontally opposed cylinder array.

Figure 7:
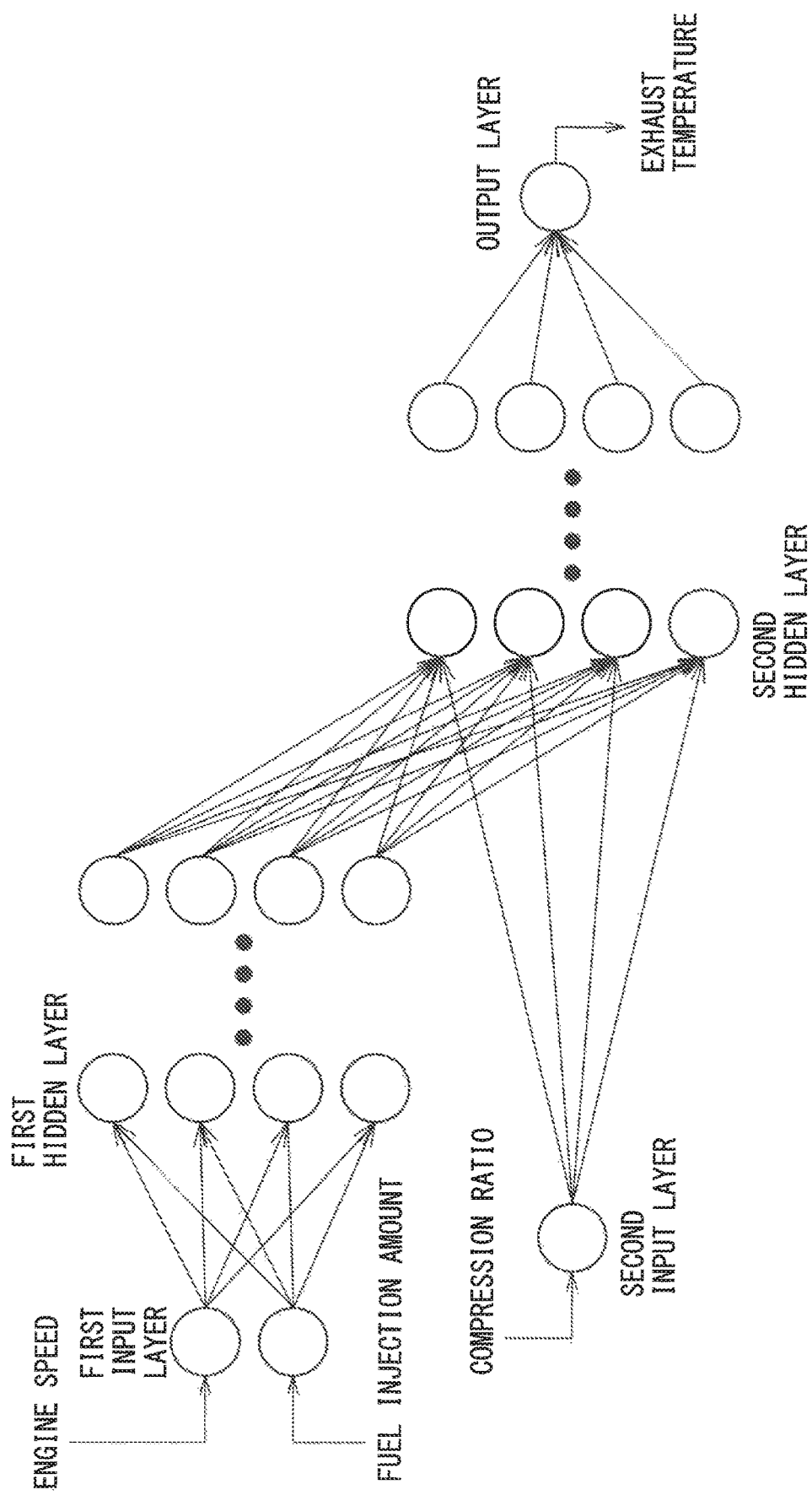
FIG. 7 is a view showing another example of a neural network in the first embodiment.

FIG. 7 is a view showing another example of the neural network in the first embodiment. As shown in FIG. 7, the neural network may include at least one hidden layer between the first hidden layer connected to the first input layer and the second hidden layer connected to the second input layer. Further, as shown in FIG. 7, the neural network may include at least one hidden layer between the second hidden layer and the output layer. By doing this, even if the event handled by the neural network is complicated (for example, if the number of input parameters or output parameters is large), it is possible to raise the prediction precision of the output parameters.

The learning of the neural network (that is, the setting of the weights "w" and biases "b") is performed before the model using a neural network is mounted in the vehicle. In learning of the neural network, sets of training data including the design values of the vehicle drive device, the actually measured values of input parameters other than the design values, and actually measured values (true data) of the output parameters corresponding to the same are used. Specifically, by using a large number of sets of training data to repeatedly update the weights "w" and biases "b" of the neural network by the above-mentioned error backpropagation algorithm, the weights "w" and biases "b" are set. As a result, the neural network is trained and a trained model using the neural network is generated.

The generated trained model is mounted in the ECU 61 of the vehicle. Note that, the design values, the actually measured values of the input parameters, and the actually measured values of the output parameters for the sets of training data are for example acquired in advance using an engine bench etc. Further, the learning of the neural network is, for example, performed using a computer installed at the factory (for example, computer equipped with a GPU).

<Flow Chart>

Figure 8:
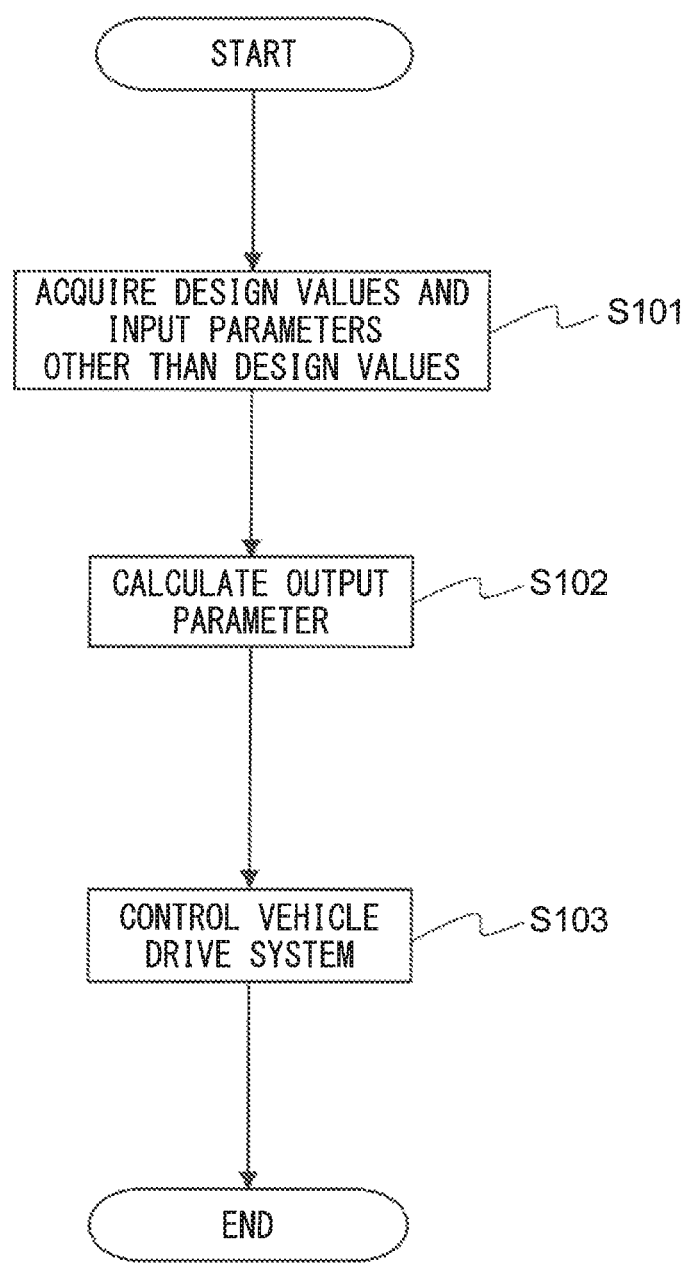
FIG. 8 is a flow chart showing a control routine for controlling a vehicle drive device in the first embodiment.

FIG. 8 is a flow chart showing a control routine for controlling the vehicle drive device in the first embodiment. The control routine is repeatedly performed by the ECU 61 at predetermined intervals.

First, at step S101, the processing part 81 acquires the design values of the vehicle drive device and the input parameters of the vehicle other than the design values. The design values of the vehicle drive device are preset value stored in the memory 63 of the ECU 61. The input parameters of the vehicle other than the design values are calculated at the ECU 61 using various types of sensors etc., and are acquired by the processing part 81.

For example, as the input parameters of the vehicle other than the design values, the engine speed and the amount of fuel injection from the fuel injectors 21 are used. In this case, the engine speed is calculated based on the output of the crank angle sensor 79, and the amount of fuel injection from the fuel injectors 21 is calculated based on a command value output from the ECU 61 to the fuel injectors 21. Further, when the engine load is used as the input parameter of the vehicle other than the design values, the engine load is calculated based on the output of the load sensor 78.

Next, at step S102, the processing part 81 uses the trained model using a neural network to calculate the output parameter of the vehicle based on the design values of the vehicle drive device and the input parameters of the vehicle other than the design values. Specifically, the processing part 81 inputs the design values and input parameters acquired at step 101 to the neural network and makes the neural network output the output parameter. For example, if the neural network shown in FIG. 4 is used, the input parameters other than the design values are input to the first input layer and a design value is input to the second input layer.

Next, at step S103, the control part 82 controls the vehicle drive device (in the present embodiment, the internal combustion engine 1) based on the output parameter calculated at the processing part 81. For example, if the output parameter is the exhaust temperature, the control part 82 controls the fuel injection amount, fuel injection timing, opening degree of the EGR control valve 52, etc., so that the exhaust temperature approaches the target value. After step S103, the present control routine ends.

Second Embodiment

The configuration and control of the machine learning system according to the second embodiment are basically similar to the machine learning system in the first embodiment. For this reason, below, the second embodiment of the present invention will be explained focusing on the parts different from the first embodiment.

Figure 9:
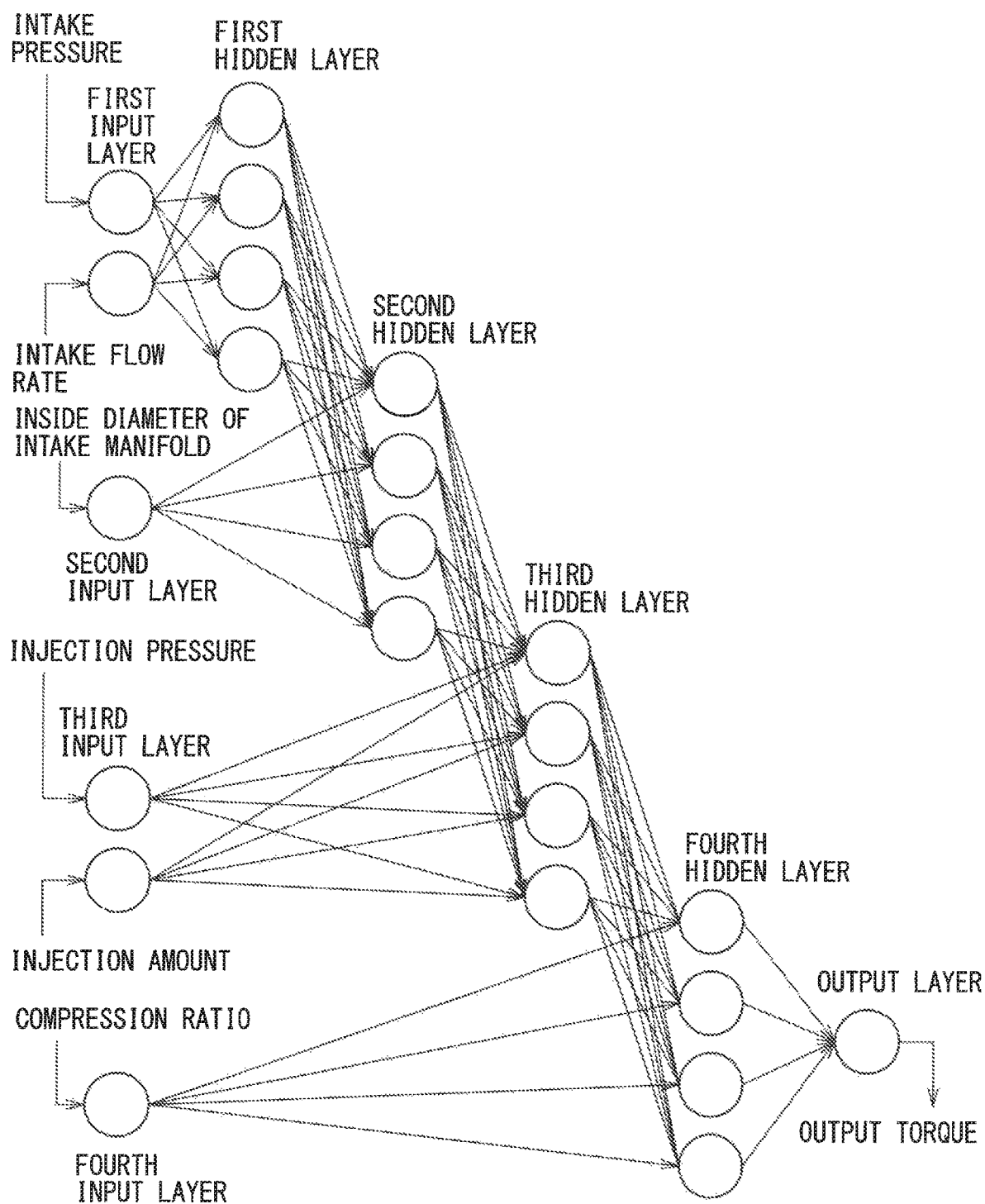
FIG. 9 is a view showing an example of a neural network in a second embodiment.

In the second embodiment, in the processing part 81, the neural network such as shown in FIG. 9 is used. FIG. 9 is a view showing one example of a neural network in the second embodiment.

As shown in FIG. 9, the neural network includes a first input layer, second input layer, third input layer, and fourth input layer. Therefore, the neural network includes a plurality of input layers. Input parameters of the vehicle other than the design values of the vehicle drive device are input to the first input layer and third input layer, while the design values of the vehicle drive device are input to the second input layer and fourth input layer.

In the neural network shown in FIG. 9, as the output parameter, the output torque of the internal combustion engine 1 is used. In this case, for example, the input parameters are set as follows:

As the input parameters of the vehicle input to the first input layer, the pressure and the flow rate of the intake inside the intake manifold 31 are used, and the number of nodes at the first input layer becomes two. As the design value input to the second input layer, the inside diameter of the intake manifold 31 is used, and the number of the node at the second input layer becomes one. As the input parameters of the vehicle input to the third input layer, the injection pressure and injection amount of fuel injected to the inside of the cylinders 11 of the internal combustion engine 1, that is, the fuel injection pressure and fuel injection amount of the fuel injectors 21, are used, and the number of nodes at the third input layer becomes two. As the design value input to the fourth input layer, the compression ratio of the internal combustion engine 1 is used, and the number of the node at the fourth input layer becomes one.

The inside diameter of the intake manifold 31 and the compression ratio of the internal combustion engine 1 are preset and stored in the memory 63 of the ECU 61. The inside diameter of the intake manifold 31 is for example the inside diameter of the end part at the intake port side. The input parameters are for example calculated as follows at the ECU 61 using the various types of sensors etc., and are acquired by the processing part 81. The pressure of the intake of the intake manifold 31 is calculated based on the output of the intake pressure sensor 73. The flow rate of the intake in the intake manifold 31 is calculated based on the output of the air flow meter 71 and the command value output from the ECU 61 to the EGR control valve 52. The injection pressure of the fuel injected into the cylinders 11 of the internal combustion engine 1 is calculated based on the output of the fuel temperature sensor 74. The amount of injection of fuel injected to the cylinders 11 of the internal combustion engine 1 is calculated based on the command value output from the ECU 61 to the fuel injectors 21.

Further, the neural network includes a first hidden layer, second hidden layer, third hidden layer, and fourth hidden layer. Therefore, the neural network includes a plurality of hidden layers. In the example of FIG. 9, there are respectively an equal number of four nodes in the first hidden layer, second hidden layer, third hidden layer, and fourth hidden layer. Further, in the example of FIG. 9, the number of input layers and the number of hidden layers are equal.

The first input layer is connected to the first hidden layer. Specifically, the nodes of the first input layer are respectively connected to all of the nodes of the first hidden layer. For this reason, the first hidden layer receives as input the outputs of the first input layer. Specifically, the nodes of the first hidden layer respectively receive as input the outputs of all of the nodes of the first input layer.

The second input layer is connected to the second hidden layer. Specifically, the node of the second input layer is connected to all of the nodes of the second hidden layer. For this reason, the second hidden layer receives as input the output of the second input layer. Specifically, the nodes of the second hidden layer respectively receive as input the output of the node of the second input layer.

Further, the second hidden layer receives, as input, values correlated with the outputs of the first hidden layer as well. In the example of FIG. 9, the first hidden layer is connected to the second hidden layer. Specifically, the nodes of the first hidden layer are respectively connected to all of the nodes of the second hidden layer. For this reason, the second hidden layer receives as input the outputs of the first hidden layer. Specifically, the nodes of the second hidden layer respectively receive as input the outputs of all of the nodes of the first hidden layer.

The third input layer is connected to the third hidden layer. Specifically, the nodes of the third input layer are respectively connected to all of the nodes of the third hidden layer. For this reason, the third hidden layer receives as input the outputs of the third input layer. Specifically, the nodes of the third hidden layer respectively receive as input the outputs of all of the nodes of the third input layer.

Further, the third hidden layer receives, as input, values correlated with the outputs of the second hidden layer as well. In the example of FIG. 9, the second hidden layer is connected to the third hidden layer. Specifically, the nodes of the second hidden layer are respectively connected to all of the nodes of the third hidden layer. For this reason, the third hidden layer receives as input the outputs of the second hidden layer. Specifically, the nodes of the third hidden layer respectively receive as input the outputs of all of the nodes of the second hidden layer.

The fourth input layer is connected to the fourth hidden layer. Specifically, the node of the fourth input layer is connected to all of the nodes of the fourth hidden layer. For this reason, the fourth hidden layer receives as input the output of the fourth input layer. Specifically, the nodes of the fourth hidden layer respectively receive as input the output of all of the nodes of the fourth input layer.

Further, the fourth hidden layer receives, as input, values correlated with the outputs of the third hidden layer as well. In the example of FIG. 9, the third hidden layer is connected to the fourth hidden layer. Specifically, the nodes of the third hidden layer are respectively connected to all of the nodes of the fourth hidden layer. For this reason, the fourth hidden layer receives as input the outputs of the third hidden layer. Specifically, the nodes of the fourth hidden layer respectively receive as input the outputs of all of the nodes of the third hidden layer.

Further, the neural network includes an output layer outputting the output parameter of the vehicle. The output layer outputs the output parameter of the vehicle based on the outputs of the first hidden layer, the outputs of the second hidden layer, the outputs of the third hidden layer, and the outputs of the fourth hidden layer. As explained above, for example, as the output parameter of the vehicle, the torque of the internal combustion engine 1 is used. In this case, the number of the node at the output layer is one.

Further, the output layer receives, as input, values correlated with the outputs of the fourth hidden layer. In the example of FIG. 9, the fourth hidden layer is connected to the output layer. Specifically, the nodes of the fourth hidden layer are respectively connected to the node of the output layer. For this reason, the output layer receives as input the outputs of the fourth hidden layer. Specifically, the node of the output layer receives as input the outputs of all of the nodes of the fourth hidden layer.

As explained above, the design values are believed to function so as to correct the feature values generated from the input parameters other than the design values. For this reason, as shown in FIG. 9, the neural network is configured so that the second hidden layer to which the second input layer is connected becomes closer to the output layer than the first hidden layer to which the first input layer is connected. In other words, the neural network is configured so that the second hidden layer to which the second input layer is connected becomes a deeper layer than the first hidden layer to which the first input layer is connected. As a result, the design values and the feature values generated from input parameters other than the design values are input to the second hidden layer, and thus the above function is realized by the second hidden layer. As a result, it is possible to improve the prediction precision of the output parameter.

Further, as shown in FIG. 9, the neural network is configured so that the fourth hidden layer to which the fourth input layer is connected becomes closer to the output layer than the third hidden layer to which the third input layer is connected. In other words, the neural network is configured so that the fourth hidden layer to which the fourth input layer is connected becomes a deeper layer than the third hidden layer to which the third input layer is connected. As a result, the design values and the feature values generated from the input parameters other than the design values are input to the fourth hidden layer, and thus the above function is realized by the fourth hidden layer. As a result, it is possible to improve the prediction precision of the output parameter.

Further, in a series of phenomena occurring in succession, the parameters relating to a phenomenon at a relatively later point of time may be affected by the parameters relating to a phenomenon at a relatively earlier point of time. Therefore, in the second embodiment, the neural network is configured so that the hidden layer to which the input layer to which parameters relating to a phenomenon at a relatively later point of time are input is connected becomes closer to the output layer than the hidden layer to which the input layer in which parameters relating to the phenomenon at the relatively earlier point of time are input is connected. By doing this, it is possible to express the changes along with time of the phenomena by a neural network and possible to further improve the prediction precision of the output parameter.

In the example of FIG. 9, the intake pressure and intake flow rate input to the first input layer and the inside diameter of the intake manifold 31 input to the second input layer are parameters relating to the inflow of intake to the inside of the cylinders 11. On the other hand, the fuel injection pressure and fuel injection amount input to the third input layer and the compression ratio of the internal combustion engine 1 input to the fourth input layer are parameters relating to combustion of the air-fuel mixture. The combustion of the air-fuel mixture is the phenomenon occurring after the inflow of intake to the inside of the cylinders 11.

For this reason, as shown in FIG. 9, the neural network is configured so that the third hidden layer connected to the third input layer becomes closer to the output layer than the second hidden layer connected to the second input layer. That is, the neural network is configured so that the third hidden layer and the fourth hidden layer connected to the third input layer and the fourth input layer to which the parameters relating to the phenomenon at a relatively later point of time are input become closer to the output layer than the first hidden layer and second hidden layer connected to the first input layer and second input layer to which the parameters relating to the phenomenon at a relatively earlier point of time are input. As a result, feature values relating to the inflow of intake to the inside of the cylinders 11 are input to the third hidden layer and the fourth hidden layer and are effected by the parameters relating to the combustion of the air-fuel mixture at the third hidden layer and the fourth hidden layer.

Note that, the neural network shown in FIG. 9 may include another hidden layer between the first hidden layer and second hidden layer, between the second hidden layer and third hidden layer, between the third hidden layer and the fourth hidden layer, or between the fourth hidden layer and output layer. Further, the numbers of nodes of the input layers, hidden layers, and output layer respectively may be one or more other numbers. Further, the numbers of the hidden layers may differ.

For example, as the input parameters input to the input layers and output parameter, parameters different from FIG. 9 may be used. For example, as the input parameter input to the third input layer, instead of the fuel injection amount, the engine load may be used. Further, as the design values input to the fourth input layer, in addition to the compression ratio of the internal combustion engine 1, the number of cylinders and cylinder array of the internal combustion engine 1 may be used. In this case, the number of nodes in the fourth input layer becomes three. Further, if the cylinder array is input to the fourth input layer, the cylinder array is converted to a numerical value. For example, "1" is assigned to an in-line cylinder array, 2 is assigned to a V-shaped cylinder array, and 3 is assigned to a horizontally opposed cylinder array.

Third Embodiment

The configuration and control of the electronic control unit used in the machine learning system according to the third embodiment basically are similar to the electronic control unit in the first embodiment. For this reason, below, the third embodiment of the present invention will be explained focusing on the parts different from the first embodiment.

In the third embodiment, a trained model using a neural network is generated in the server at the outside of the vehicle. The trained model received from the server to the vehicle is used at the processing part 81. Due to this, it is possible to replace or add the trained model in accordance with need and possible to use the neural network to obtain the desired output parameters. Further, by using communication with the server to update the weights etc., of the neural network, it is possible to raise the precision of prediction of the output parameters.

Figure 10:
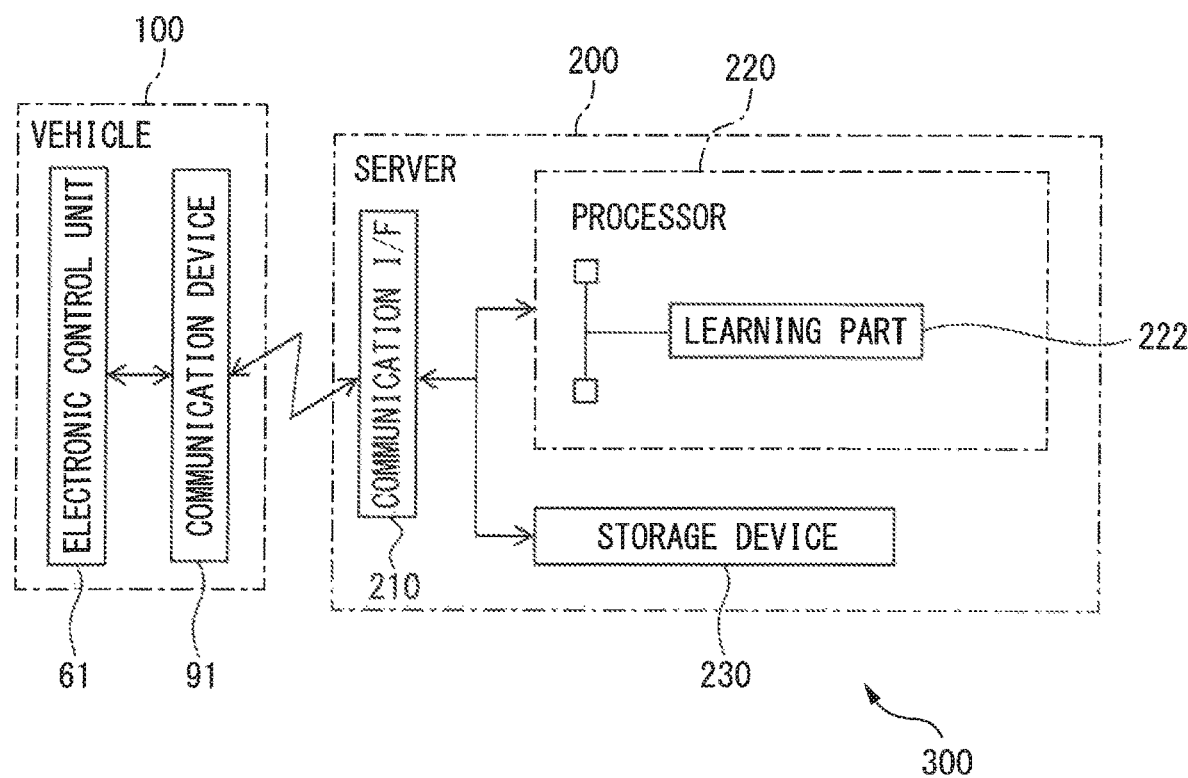
FIG. 10 is a view schematically showing a machine learning system according to a third embodiment.

FIG. 10 is a view schematically showing a machine learning system according to the third embodiment. The machine learning system 300 is provided with an electronic control unit (ECU) 61 and communication device 91 provided at the vehicle 100 and a server 200 outside of the vehicle 100. In the same way as the first embodiment, as shown in FIG. 2, the processor 65 of the ECU 61 has a processing part 81 and control part 82.

The ECU 61 and the communication device 91 can be connected to communicate with each other through an in-vehicle network based on the standards of the CAN (Controller Area Network) etc. The communication device 91 is a device able to communicate through a communication network with the server 200 and, for example, is a data communication module (DCM). The communication device 91 and the server 200 communicate by wireless communication based on various communication standards.

The server 200 is provided with a communication interface 210, storage device 230, and processor 220. The communication interface 210 and storage device 230 are connected through a signal line to a processor 220. Note that, the server 200 may be further provided with a keyboard and mouse or other such input device, a display or other such output device, etc.

The communication interface 210 has an interface circuit for connecting the server 200 through a communication network with the communication device 91 of the vehicle 100. The storage device 230, for example, is comprised of a hard disk drive (HDD), solid state drive (SDD), optical storage medium, random access memory (RAM), or other such semiconductor memory etc.

The storage device 230 stores various types of data. Specifically, the storage device 230 stores sets of training data for learning operations of the neural network (for example, sets of training data including the input parameters other than the design values, the design values, and output parameters) and a computer program for learning operations of the neural network. The design values, actually measured values of the input parameters other than the design values, and actually measured values of the output parameters for sets of training data are for example acquired in advance using an engine bench etc. Note that, these parameters for sets of training data may be acquired at other vehicles different from the vehicle 100 and sent from communication devices provided at the other vehicles to the server 200.

As shown in FIG. 10, the processor 220 of the server 200 is provided with a learning part 222 as a functional block. The learning part 222 uses the sets of training data stored in the storage device 230 of the server 200 to train the neural network and generate a trained model using a neural network. Specifically, by using a large number of sets of training data to repeatedly update the weights "w" and biases "b" of the neural network by the above-mentioned error backpropagation algorithm, the weights "w" and biases "b" are set. As a result, the neural network is trained and a trained model using a neural network is generated. Note that, the neural network in the third embodiment has a configuration similar to the first embodiment or the second embodiment (for example, see FIG. 4, FIG. 7, and FIG. 9).

If the learning part 222 generates a trained model, the generated trained model is sent through the communication interface 210 of the server 200 and the communication device 91 of the vehicle 100 from the server 200 to the ECU 61. The processing part 81 of the ECU 61 receives the trained model from the server 200 through the communication device 91 and uses the received trained model to calculate the output parameters of the vehicle. Further, if the control part 82 of the ECU 61 controls the vehicle drive device, the control routine of FIG. 8 is performed in the same way as the first embodiment.

Fourth Embodiment

The configuration and control of the machine learning system according to the fourth embodiment are basically similar to the machine learning system in the third embodiment. For this reason, below, the fourth embodiment of the present invention will be explained focusing on the parts different from the third embodiment.

In the fourth embodiment, in the same way as the third embodiment, a trained model using a neural network is generated at a server outside the vehicle. The learned model received from the server to the vehicle is used in the processing part 81. On the other hand, in the third embodiment, the design values, the actually measured values of the input parameters other than the design values, and the actually measured value of the output parameter for the sets of training data are acquired at the vehicle. By doing this, it is possible to easily prepare a large number of sets of training data.

Figure 11:
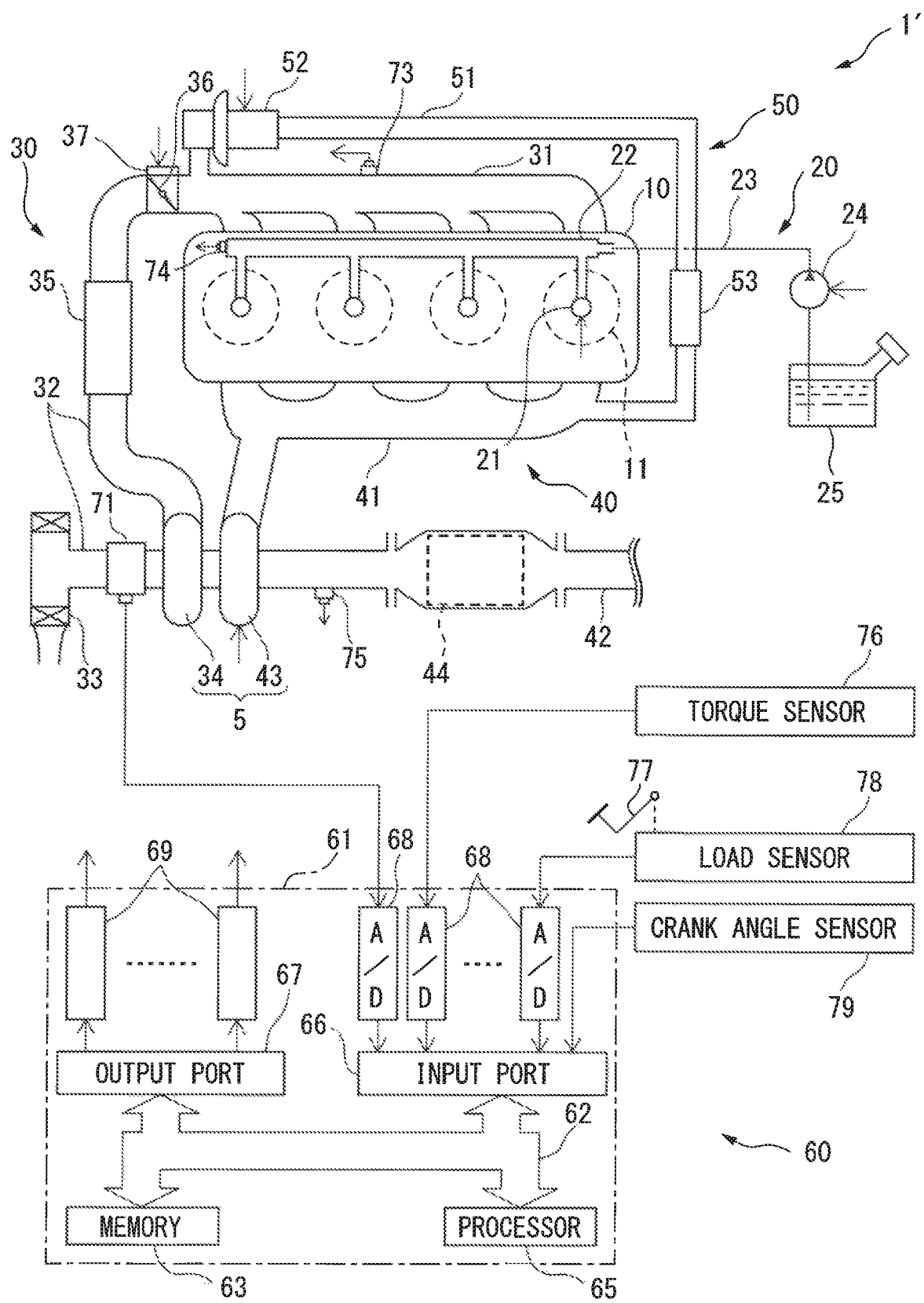
FIG. 11 is a view schematically showing an internal combustion engine provided in a vehicle to which a machine learning system according to a fourth embodiment is applied.

FIG. 11 is a view schematically showing an internal combustion engine provided at a vehicle in which the machine learning system according to the fourth embodiment is applied. At the internal combustion engine 1', an exhaust temperature sensor 75 and torque sensor 76 are provided in addition to the various types of sensors shown in FIG. 1.

The exhaust temperature sensor 75 is arranged in the exhaust passage of the internal combustion engine 1', for example, between the turbine 43 and the DPF 44, and detects the temperature of the exhaust gas flowing through the exhaust passage (exhaust temperature). The torque sensor 76 is, for example, arranged at the output shaft of the internal combustion engine 1' (crankshaft) and detects the output torque of the internal combustion engine 1'. The outputs of the exhaust temperature sensor 75 and torque sensor 76 are input through the corresponding AD converters 68 to the input port 66 of the ECU 61.

Figure 12:
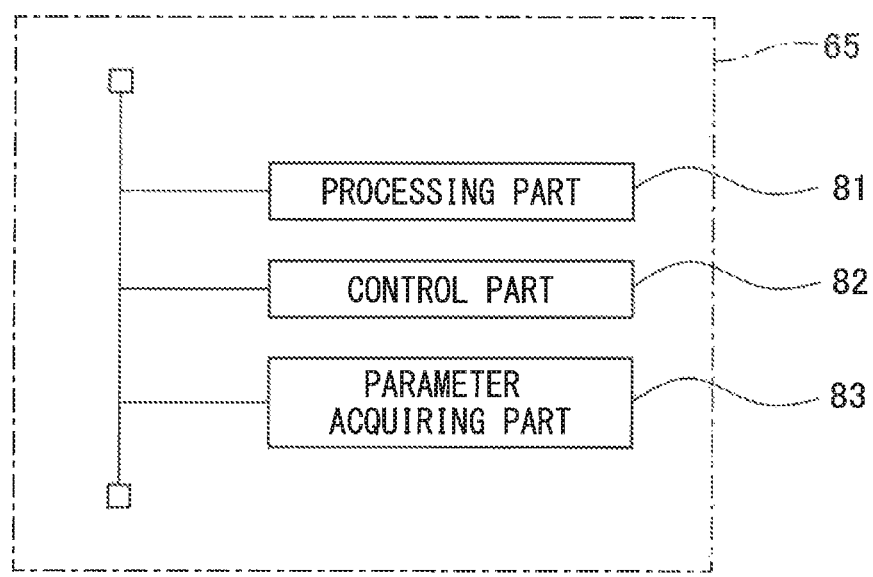
FIG. 12 is a functional block diagram of a processor of an ECU in the fourth embodiment.

In the same way as the third embodiment, as shown in FIG. 10, the machine learning system 300 is provided with an electronic control unit (ECU) 61 and communication device 91 provided at the vehicle 100, and a server 200 at the outside of the vehicle 100. FIG. 12 is a functional block diagram of the processor 65 of the ECU 61 in the fourth embodiment. In the fourth embodiment, the processor 65 has a parameter acquiring part 83 in addition to the processing part 81 and control part 82.

The parameter acquiring part 83 acquires the design values of the vehicle drive device, the input parameters of the vehicle other than the design values, and the output parameter of the vehicle 100. Specifically, the parameter acquiring part 83, in the same way as the processing part 81, acquires the input parameters of the vehicle 100 other than the design values calculated by the ECU 61 based on the outputs of the various types of sensors etc. Further, the parameter acquiring part 83 acquires the output parameters calculated by the ECU 61 based on the outputs of the various types of sensors etc. For example, when the output parameter is the exhaust temperature, the parameter acquiring part 83 acquires the exhaust temperature calculated based on the output of the exhaust temperature sensor 75. Further, when the output parameter is the output torque of the internal combustion engine 1', the parameter acquiring part 83 acquires the output torque of the internal combustion engine 1' calculated based on the output of the torque sensor 76. The design values are preset and stored in the memory 63 of the ECU 61.

The parameter acquiring part 83 sends the acquired design values, input parameters other than the design values, and an output parameter through the communication device 91 to the server 200. The design values, input parameters other than the design values, and output parameter sent to the server 200 are stored in the storage device 230 of the server 200. Further, these parameters are also acquired at a plurality of other vehicles having design values of the vehicle drive device different from the vehicle 100 and are sent from the communication devices provided at the vehicles to the server 200. The parameters are sent from the vehicle 100 and the other vehicles to the server 200 repeatedly so as to obtain a large number of sets of training data.

The training part 222 of the server 200 uses the design values, the input parameters other than the design values, and output parameter acquired by the parameter acquiring part 83 as a set of training data to generate a trained model using a neural network. Specifically, by using a large number of sets of training data and using the above-mentioned error backpropagation algorithm to repeatedly update the weights "w" and biases "b" of the neural network, the weights "w" and biases "b" are set. As a result, the neural network is trained, and a trained model using the neural network is generated.

Further, in the same way as the third embodiment, the training part 222 of the server 200 sends the trained model to the processing part 81, and the processing part 81 uses the received trained model to calculate the output parameter. By using the trained model to calculate the output parameter, before the sensor etc., detects the output parameter, it is possible to predict the output parameter for the predetermined input parameters.

Further, if the control part 82 of the ECU 61 controls the vehicle drive device, the control routine of FIG. 8 is performed in the same way as the first embodiment.

Other Embodiments

Above, preferred embodiments according to the present invention were explained, but the present invention is not limited to these embodiments and can be corrected and changed in various ways within the language of the claims.

For example, at the neural network, the input parameters of the vehicle input to the first input layer, the design values of the vehicle drive device input to the second input layer, and the output parameters of the vehicle may be set as follows: The input parameters of the vehicle include the engine speed, fuel injection amount, fuel injection timing, fuel injection pressure, temperature and pressure of the intake inside the intake manifold 31, opening degree of the EGR control valve 52, and amount of intake air. Further, the design values include the compression ratio of the internal combustion engine 1, 1' and the number of nozzles and nozzle diameters of the fuel injectors 21. Further, the output parameters of the vehicle include the sound pressure of the combustion noise, the output torque of the internal combustion engine 1, 1', the concentration of harmful substances discharged from the engine body 10, and the thermal efficiency of internal combustion engine 1, 1'. The harmful substances are, for example, carbon monoxide (CO), hydrocarbons (HC), nitrogen oxides ($NO_x$), particulate matter (PM), etc. In this case as well, the input parameters and output parameters can be calculated based on the outputs of various types of sensors etc., at the ECU 61. Further, the design values are preset and stored in the memory 63 of the ECU 61.

Further, the vehicle drive device may be a drive device other than an internal combustion engine, for example, a motor, transmission, battery, etc. For example, the model using the neural network in the present embodiment may be applied to a battery mounted in a hybrid vehicle (HV), plug-in hybrid vehicle (PHV), or electric vehicle (EV). In this case, the input parameters of the vehicle input to the first input layer, the design values of the vehicle drive device input to the second input layer, and the output parameters of the vehicle are, for example, set as follows:

The first input parameters include the battery voltage, battery current, battery temperature, state of charge of the battery (SOC) at the time of start of operation of the vehicle, and continuous operating time of the vehicle. Further, the second input parameters include the battery capacity and the energy density of the battery. Further, the output parameters include the SOC of the battery during operation of the vehicle. In this case as well, the input parameters and output parameters can be calculated at the ECU 61 based on the outputs of the various types of sensors etc. Further, the design values are preset and are stored in the memory 63 of the ECU 61.

Further, a trained model using the neural network such as explained above may be used for an output parameter calculation device configured to calculate at least one output parameter based on at least one input parameter other than at least one design value of a hardware, and the at least one design value of the hardware. In this case, the at least one input parameter, at least one design value, and at least one output parameter are not limited to parameters relating to the vehicle.

REFERENCE SIGNS LIST

1, 1'. internal combustion engine
60. control device of vehicle drive device
61. electronic control unit (ECU)
81. processing part
82. control part
83. parameter acquiring part
91. communication device
100. vehicle
200. server
300. machine learning system

The invention claimed is:

1. A control device of a vehicle drive device comprising a processor programmed to:
use a trained model using a neural network to calculate at least one output parameter of a vehicle, and
control the vehicle drive device mounted in a vehicle based on the at least one output parameter calculated by the processor, wherein
the neural network includes:
a first input layer to which at least one input parameter of the vehicle other than at least one design value of the vehicle drive device is input, the at least one design value being a non-zero value not changing in accordance with an operating state of the vehicle,
a second input layer to which the at least one design value is input,
a first hidden layer to which outputs of the first input layer are input,
a second hidden layer to which outputs of the second input layer are input, and an output layer outputting the at least one output parameter, and the neural network is configured so that the second hidden layer becomes closer to the output layer than the first hidden layer.

2. The control device of a vehicle drive device according to claim 1, wherein the neural network is configured so that the outputs of the first hidden layer are input to the second hidden layer.

3. The control device of a vehicle drive device according to claim 1, wherein the neural network includes at least one hidden layer between the first hidden layer and the second hidden layer.

4. The control device of a vehicle drive device according to claim 1, wherein the neural network is configured so that the outputs of the second hidden layer are input to the output layer.

5. The control device of a vehicle drive device according to claim 1, wherein the neural network includes at least one hidden layer between the second hidden layer and the output layer.

6. The control device of a vehicle drive device according to claim 1, wherein the processor is programmed to control an internal combustion engine mounted in a vehicle, the at least one input parameter includes an engine speed and fuel injection amount, the at least one design value includes a compression ratio of the internal combustion engine, and the at least one output parameter includes an exhaust temperature.

7. The control device of a vehicle drive device according to claim 6, wherein the at least one design value further include a number of cylinders of the internal combustion engine and a cylinder array of the internal combustion engine.

8. The control device of a vehicle drive device according to claim 1, wherein the neural network further includes a third input layer to which at least one input parameter of the vehicle other than the at least one design value is input, a fourth input layer to which the at least one design value is input, a third hidden layer to which outputs of the third input layer are input, and a fourth hidden layer to which outputs of the fourth input layer are input and is configured so that the third hidden layer is closer to the output layer than the second hidden layer and the fourth hidden layer is closer to the output layer than the third hidden layer, the processor is programmed to control an internal combustion engine mounted in the vehicle, and the at least one input parameter input to the first input layer includes a pressure and flow rate of intake in an intake manifold, the at least one design value input to the second input layer includes an inside diameter of the intake manifold, the at least one input parameter input to the third input layer includes an injection pressure and injection amount of fuel injected into cylinders of the internal combustion engine, the at least one design value input to the fourth input layer includes a compression ratio of the internal combustion engine, and the output parameters include an output torque of the internal combustion engine.

9. The control device of a vehicle drive device according to claim 1, wherein the at least one design value is not input to the first input layer.

10. A vehicle-mounted electronic control unit comprising a processor programmed to receive a trained model using a neural network through a communication device provided in a vehicle from a server at an outside of the vehicle and use the trained model to calculate at least output parameter of the vehicle, wherein the neural network includes a first input layer to which at least one input parameter of the vehicle other than at least one design value of the vehicle drive device mounted in the vehicle is input, a second input layer to which the at least one design value is input, the at least one design value being a non-zero value not changing in accordance with an operating state of the vehicle, a first hidden layer to which outputs of the first input layer are input, a second hidden layer to which outputs of the second input layer are input, and an output layer outputting at least one output parameter, the neural network being configured so that the second hidden layer becomes closer to the output layer than the first hidden layer, and the server comprises a storage device storing sets of training data including the at least one input parameter, the at least one design value, and the at least one output parameter, and uses the sets of training data to generate the trained model.

11. The vehicle-mounted electronic control unit according to claim 10, wherein the at least one design value is not input to the first input layer.

12. A vehicle-mounted electronic control unit comprising a processor programmed to:

acquire at least one design value of a vehicle drive device mounted in a vehicle, at least one input parameter of the vehicle other than the at least one design value, and at least one output parameter of the vehicle, the at least one design value being a non-zero value not changing in accordance with an operating state of the vehicle, send the at least one design value, the at least one input parameter, and the at least one output parameter through a communication device provided in the vehicle to a server at an outside of the vehicle, and receive a trained model using a neural network from the server through the communication device and use that trained model to calculate the at least one output parameter, wherein the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter, the neural network is configured so that the second hidden layer becomes closer to the output layer than the first hidden layer, and the server uses the acquired at least one input parameters, the acquired at least one design value, and the acquired at least one output parameter as sets of training data to generate the trained model.

13. The vehicle-mounted electronic control unit according to claim 12, wherein the at least one design value is not input to the first input layer.

14. A machine learning system comprising an electronic control unit provided at a vehicle, a communication device provided at the vehicle, and a server at an outside of the vehicle, wherein the electronic control unit comprises a processor programmed to:
acquire at least one design value of a vehicle drive device mounted in the vehicle, at least one input parameter of the vehicle other than the at least one design value, and at least one output parameter of the vehicle, the at least one design value being a non-zero value not changing in accordance with an operating state of the vehicle,
send the at least one design value, the at least one input parameter, and the at least one output parameter through the communication device to the server, and
receive a trained model using a neural network from the server through the communication device and use the trained model to calculate the at least one output parameter,
the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter,
the neural network is configured so that the second hidden layer becomes closer to the output layer than the first hidden layer, and
the server uses the acquired at least one input parameter, the acquired at least one design value, and the acquired at least one output parameter as sets of training data to generate the trained model.

15. The machine learning system according to claim 14, wherein the at least one design value is not input to the first input layer.

16. A method of controlling a vehicle drive device comprising:
acquiring at least one design value of a vehicle drive device mounted in a vehicle and at least one input parameter of the vehicle other than the at least one design value, the at least one design value being a non-zero value not changing in accordance with an operating state of the vehicle,
using a trained model using a neural network to calculate at least one output parameter of the vehicle based on the at least one design value and the at least one input parameter, and
controlling the vehicle drive device based on the at least one output parameter, wherein
the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter, and
the neural network is configured so that the second hidden layer becomes closer to the output layer than the first hidden layer.

17. The method according to claim 16, wherein the at least one design value is not input to the first input layer.

18. A method of producing an electronic control unit comprising:
using at least one design value of a vehicle drive device mounted in a vehicle, at least one input parameter of the vehicle other than the at least one design value, and at least one output parameter of the vehicle as sets of training data to generate a trained model using a neural network, the at least one design value being a non-zero value not changing in accordance with an operating state of the vehicle, and
implementing the trained model in the electronic control unit, wherein
the neural network includes a first input layer to which the at least one input parameter is input, a second input layer to which the at least one design value is input, a first hidden layer to which outputs of the first input layer are input, a second hidden layer to which outputs of the second input layer are input, and an output layer outputting the at least one output parameter, and
the neural network is configured so that the second hidden layer becomes closer to the output layer than the first hidden layer.

19. The method according to claim 18, wherein the at least one design value is not input to the first input layer.

20. A non-transitory computer-readable storage medium storing an output parameter calculation program, the output parameter calculation program causing a processor to execute functions, comprising:
using at least one design value of a vehicle drive device mounted in a vehicle, at least one input parameter of the vehicle other than the at least one design value, and at least one output parameter of the vehicle as sets of training data to generate a trained model using a neural network, the at least one design value being a non-zero value not changing in accordance with an operating state of the vehicle, and
implementing the trained model to control the vehicle drive device, wherein
the neural network includes a first input layer to which at least one input parameter other than at least one design value of a hardware is input, a second input layer to which the at least one design value is input, a first hidden layer to which outputs of the first input layer are input, a second hidden layer to which outputs of the second input layer are input, and an output layer outputting at least one output parameter, and
the neural network is configured so that the second hidden layer becomes closer to the output layer than the first hidden layer, and to calculate the at least one output parameter based on the at least one input parameter and the at least one design value.

21. The non-transitory computer-readable storage medium according to claim 15, wherein the at least one design value is not input to the first input layer.

* * * * *